US008854314B2

(12) United States Patent
Sharp

(10) Patent No.: US 8,854,314 B2
(45) Date of Patent: Oct. 7, 2014

(54) UNIVERSAL INTERFACE DEVICE WITH HOUSING SENSOR ARRAY ADAPTED FOR DETECTION OF DISTRIBUTED TOUCH INPUT

(75) Inventor: Ronald L. Sharp, Clinton, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1345 days.

(21) Appl. No.: 12/569,017

(22) Filed: Sep. 29, 2009

(65) Prior Publication Data

US 2011/0074700 A1    Mar. 31, 2011

(51) Int. Cl.
| G06F 3/041 | (2006.01) |
| G06F 3/0346 | (2013.01) |
| G06F 1/16 | (2006.01) |
| G06F 3/023 | (2006.01) |
| H04M 1/02 | (2006.01) |
| G06F 3/01 | (2006.01) |
| H04M 1/725 | (2006.01) |
| H04M 1/57 | (2006.01) |

(52) U.S. Cl.
CPC ........... *G06F 3/017* (2013.01); *H04M 2250/12* (2013.01); *G06F 3/0346* (2013.01); *G06F 1/1626* (2013.01); *H04M 2250/10* (2013.01); *G06F 3/023* (2013.01); *H04M 1/0202* (2013.01); *H04M 2250/22* (2013.01); *H04M 2250/02* (2013.01); *G06F 1/1694* (2013.01); *H04M 1/72533* (2013.01); *H04M 1/576* (2013.01)
USPC .......................................................... 345/173

(58) Field of Classification Search
CPC ................................. G06F 3/041; G06F 3/017
USPC ........ 345/173, 156, 167; 178/18.03; 340/671; 455/418, 566
See application file for complete search history.

(56) References Cited

U.S. PATENT DOCUMENTS 7,903,087 B2 * 3/2011 Mak-Fan et al. ............... 345/167
2003/0142069 A1 7/2003 Gatto, Jr. et al.
(Continued)

FOREIGN PATENT DOCUMENTS

CN 2735676 10/2005
JP 2005267174 9/2005

OTHER PUBLICATIONS

W.S. Yeo, "The Bluetooth Radio Ball Interface (BRBI): A Wireless Interface for Music/Sound Control and Motion Sonification," Proceedings of the International Computer Music Conference (ICMC), 2006, 4 pages, New Orleans, LA.

(Continued)

*Primary Examiner* — Fred Tzeng
(74) *Attorney, Agent, or Firm* — Ryan, Mason & Lewis, LLP

(57) ABSTRACT

A universal interface device comprises a housing having a curvilinear or other shape, and processing circuitry disposed within the housing. The housing incorporates a sensor array substantially surrounding the processing circuitry and configured to receive touch input from points distributed over an outer surface of the housing. The sensor array generates sensor signals responsive to the touch input and the sensor signals are converted by the processing circuitry into commands associated with a communication function supported by the communication device. In an illustrative embodiment, the housing has a spheroidal shape, and the sensor array is configured to receive touch input from points distributed over substantially the entire outer surface of the housing. The points distributed over the outer surface of the housing from which the sensor array receives touch input are undefined from a point of view of a user providing at least a portion of the touch input.

21 Claims, 3 Drawing Sheets

(56) References Cited

U.S. PATENT DOCUMENTS

| | | | |
|---|---|---|---|
| 2008/0108340 A1* | 5/2008 | Karstens | 455/418 |
| 2008/0246723 A1* | 10/2008 | Baumbach | 345/156 |
| 2008/0303681 A1* | 12/2008 | Herz et al. | 340/671 |
| 2009/0008234 A1* | 1/2009 | Tolbert et al. | 200/600 |
| 2009/0033617 A1 | 2/2009 | Lindberg et al. | |
| 2009/0195959 A1* | 8/2009 | Ladouceur et al. | 361/283.1 |
| 2009/0288889 A1* | 11/2009 | Carlvik et al. | 178/18.03 |
| 2010/0035656 A1* | 2/2010 | Pan | 455/566 |
| 2010/0088596 A1* | 4/2010 | Griffin et al. | 715/702 |
| 2010/0144394 A1* | 6/2010 | Han et al. | 455/566 |
| 2010/0188345 A1* | 7/2010 | Keskin et al. | 345/173 |
| 2010/0201615 A1* | 8/2010 | Tupman et al. | 345/156 |
| 2010/0289759 A1* | 11/2010 | Fisher et al. | 345/173 |
| 2010/0294938 A1* | 11/2010 | Alameh et al. | 250/342 |
| 2011/0001707 A1* | 1/2011 | Faubert et al. | 345/173 |

OTHER PUBLICATIONS

T. Hermann et al, "Real-Time Control of Sonification Models with a Haptic Interface," Procs. of the 2002 International Conference on Auditory Display, Jul. 2002, 5 pages, Kyoto, Japan.

* cited by examiner

UNIVERSAL INTERFACE DEVICE WITH HOUSING SENSOR ARRAY ADAPTED FOR DETECTION OF DISTRIBUTED TOUCH INPUT

FIELD OF THE INVENTION

The present invention relates generally to communication devices, and more particularly to hand-held communication devices capable of interfacing with multiple external devices, systems or networks.

BACKGROUND OF THE INVENTION

Hand-held communication devices are increasingly being configured to incorporate touchscreen interfaces. However, such interfaces are two-dimensional and thus limited. For example, the typical touchscreen interfaces used in mobile telephones, palmtop computers or personal digital assistants (PDAs) generally require two hands to operate, and also require that the user be viewing the screen during input. Such interfaces are generally not universal, but are instead specific and unique to the associated device, and thus each device requires its own separate interface. Users are therefore currently forced to learn and memorize a variety of different interfaces for all of the communication devices they possess. Moreover, touchscreens and other similar interfaces are vulnerable to breakage or misuse. Other conventional communication device interfaces, such as those involving keyboards, keypads, or other arrangements of buttons, can be similarly problematic.

Some hand-held communication devices have interfaces that utilize haptic feedback. One example of a device of this type is described in U.S. Patent Application Publication No. 2009/0033617, entitled "Haptic User Interface."

A wide variety of other types of interface devices are known in the art. These include, for example, universal remote control devices that can be configured to send appropriate commands to control several different devices or systems, such as televisions, video recorders, stereos, MP3 players, appliances, etc. However, such devices are generally implemented as stand-alone remote controls for in-home use, and are not easily incorporated into hand-held communication devices that support other functionality, such as the above-noted mobile telephones, palmtop computers or PDAs. In addition, existing universal remote control devices are generally limited to common two-dimensional button control arrangements with no feedback from the controlled device or system.

SUMMARY OF THE INVENTION

Illustrative embodiments of the invention provide a universal interface device or other type of communication device that can support several different types of communication functionality while avoiding the above-noted problems associated with touchscreens and other similar interfaces.

In one aspect of the invention, a universal interface device comprises a housing having a curvilinear or other shape, and processing circuitry disposed within the housing. The housing incorporates a sensor array substantially surrounding the processing circuitry and configured to receive touch input from points distributed over an outer surface of the housing. The sensor array generates sensor signals responsive to the touch input and the sensor signals are converted by the processing circuitry into commands associated with a communication function supported by the communication device.

In an illustrative embodiment, the housing has a spheroidal shape, and the sensor array is configured to receive touch input from points distributed over substantially the entire outer surface of the housing. The points distributed over the outer surface of the housing from which the sensor array receives touch input are undefined from a point of view of a user providing at least a portion of the touch input.

DETAILED DESCRIPTION OF THE INVENTION

The invention will be described herein in conjunction with illustrative embodiments of interface devices and associated systems and processing techniques. It should be understood, however, that the invention is not limited to use with the particular devices, systems and techniques described, but is instead more generally applicable to any type of communication device in which it is desirable to provide an interface having improved user control, convenience, efficiency and durability.

Figure 1:
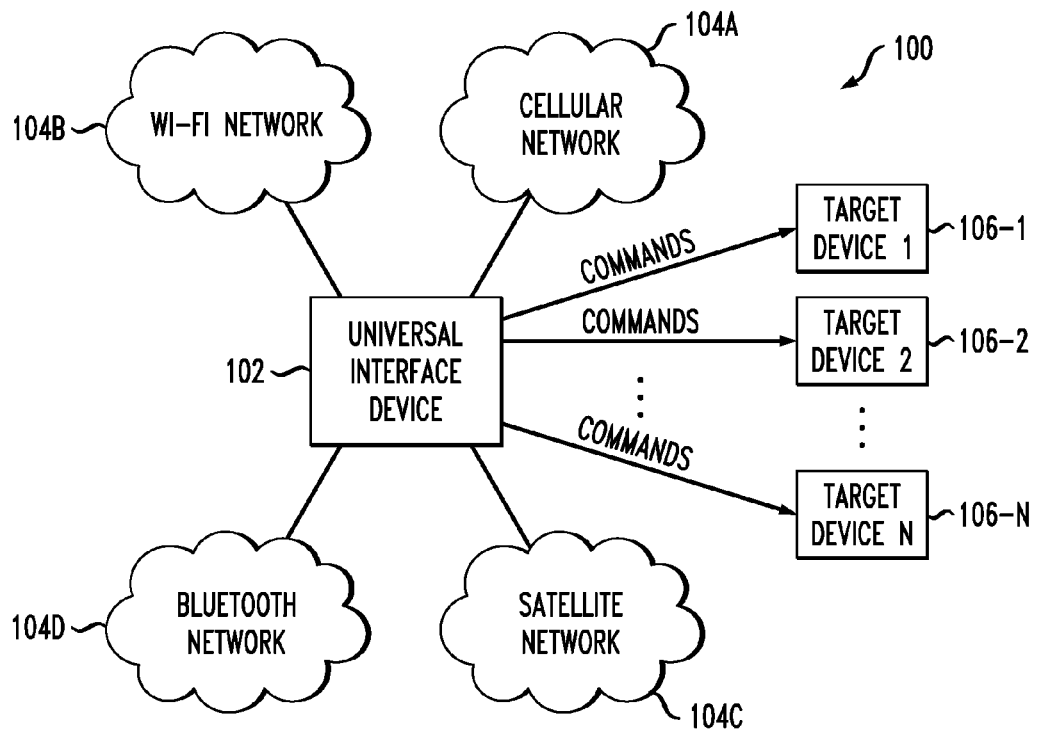
FIG. 1 is a block diagram of a communication system comprising a universal interface device in accordance with an embodiment of the invention.

FIG. 1 shows a communication system 100 which incorporates a universal interface device 102 configured in accordance with an illustrative embodiment of the invention. The universal interface device is an example of what is more generally referred to herein as a "communication device." The universal interface device is configured to support multiple communication functions, including network communication functions involving communication between the device and external networks. These networks in the present embodiment include, by way of example, a cellular network 104A, a Wi-Fi network 104B, a satellite network 104C, and a Bluetooth network 104D. In other embodiments, the device may communicate with other types of networks in addition to or in place of those shown in the figure, or may communicate with only a single network. For example, the Bluetooth network 104D may be replaced with or supplemented by one or more other networks using other types of short-range communication mechanisms, such as wireless USB.

Additional communication functions supported by the universal interface device 102 in the present embodiment include communication between the device and multiple external target devices 106-1, 106-2, . . . 106-N, which are also individually denoted in FIG. 1 as Target Device 1, Target Device 2, . . . Target Device N, where the number N denotes an arbitrary number of target devices with which the universal interface device can communicate. More specifically, the universal interface device generates sets of commands for controlling the respective target devices 106 of different types, responsive to user input supplied in a manner to be described in greater detail below. The target devices may include, for example, televisions, video recorders, video players, stereos, MP3 players, set-top boxes, mobile telephones, PDAs, computers, kiosks, elevators, parking meters, ATMs, secure entry devices, automobiles, or any other devices or systems that it may be desirable to subject to remote control.

In addition to generating commands for the target devices 106, the interface device 102 can receive communications from the target devices. Thus, in the present embodiment, two-way communication between the interface device and the target devices is supported. This allows for feedback as well as the exchange of translation tables or other data. Such translation tables can be used by the interface device to translate user input from a universal set of commands (e.g., volume control, channel control, on/off, next, skip, fast forward, pause, etc.) to particular commands understood by the target devices.

The communication system 100 may further include other elements not explicitly shown in the figure, but commonly included in conventional implementations of such systems. These and other conventional elements referred to in the present description, being well understood by those skilled in the art, will not be described in detail herein.

Figure 2:
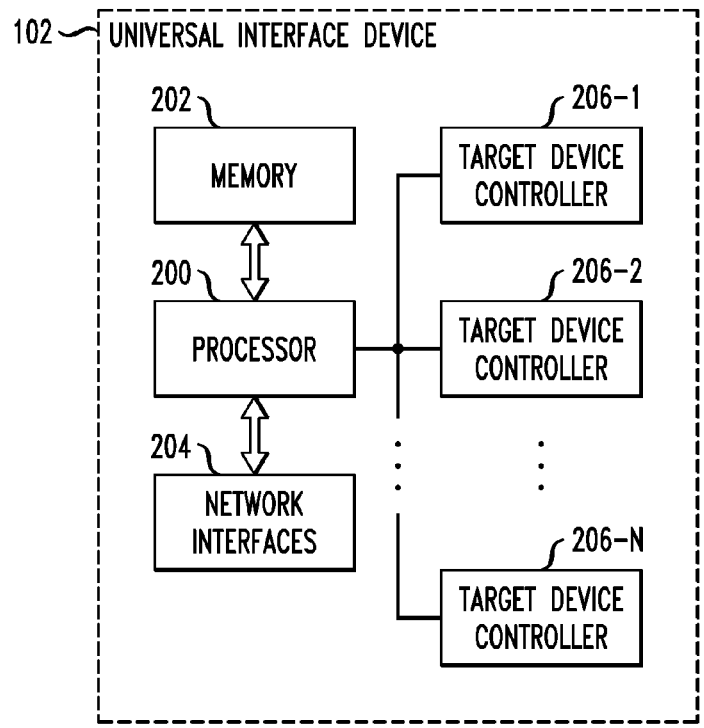
FIG. 2 is a block diagram showing the interface device of the FIG. 1 system in greater detail.

Referring now to FIG. 2, the universal interface device 102 as shown includes a processor 200 coupled to a memory 202 and to multiple network interfaces 204. The network interfaces 204 support communication between the device and the respective networks 104A, 104B, 104C and 104D of FIG. 1. The processor 200 is also coupled to N different target device controllers 206-1, 206-2, . . . 206-N, which generate the commands supplied from the device 102 to respective ones of the target devices 106-1, 106-2, . . . 106-N responsive to user input. Each of the controllers 206 may be configured to communicate with an external device of a different type, for example, one such controller may be an infrared controller, another may be a Bluetooth controller, yet another may be a wireless USB controller, and so on.

The processor 200 may comprise, for example, a microprocessor, central processing unit (CPU), digital signal processor (DSP), application-specific integrated circuit (ASIC), or other type of processing device, as well as combinations of such devices. Such a processor will typically comprise internal memory, registers, execution units and other well-known conventional elements. The memory 202 may comprise, for example, random access memory (RAM), read-only memory (ROM), disk-based memory, or other types of storage elements, in any combination.

Certain functionality of the universal interface device 102 may be implemented at least in part in the form of software program code that is stored in memory 202 and executed by processor 200. A storage element or other memory having such program code embodied therein is an example of what is more generally referred to herein as a computer-readable medium or a computer program product.

Elements 200, 202, 204 and 206 are examples of what is more generally referred to as "processing circuitry." Such circuitry in a given embodiment of the invention may include additional elements of a conventional nature that are not explicitly shown but are typically found in communication devices. For example, the device 102 may incorporate conventional circuitry generally associated with mobile telephones, palmtop computers, PDAs or other known communication devices.

Figure 3:
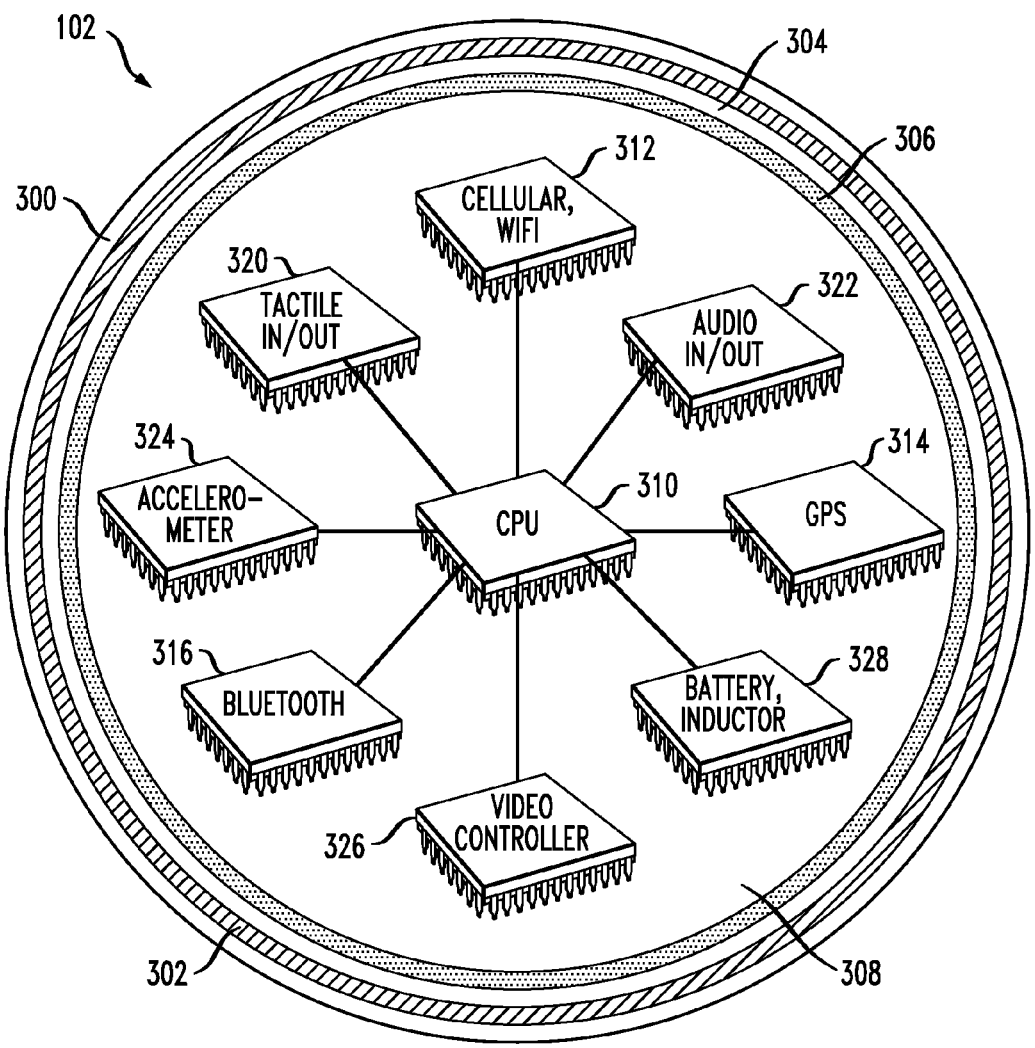
FIG. 3 illustrates housing layers and internal components of an embodiment of the invention comprising a ball-shaped interface device.

FIG. 3 shows a sectional view of the housing of universal interface device 102 and further illustrates processing circuitry that may be arranged within the housing in a given embodiment. In this embodiment, the device housing is in the shape of a sphere or ball that can be held in the hand of a user. The housing incorporates a sensor array substantially surrounding the processing circuitry and configured to receive touch input from points distributed over an outer surface of the housing.

The housing as shown in FIG. 3 more specifically comprises a plurality of overlapping layers 300, 302, 304, 306 and 308, with the sensor array being implemented in layer 306, also referred to as a sensor array layer. The plurality of layers comprises rubber outer layer 300, conductive layer 302 underlying the rubber outer layer, non-conductive layer 304 underlying the conductive layer 302 and overlying the sensor array layer 306, and support layer 308 underlying the sensor array layer 306.

Figure 4:
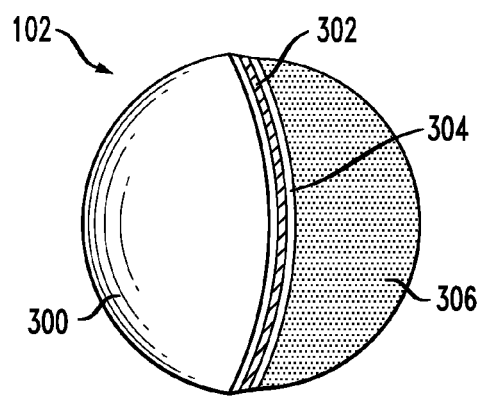
FIG. 4 is a partial cutaway view showing the multiple layers covering the interface device of FIG. 3.

The layers 300, 302, 304 and 306 of the interface device housing are also shown in partial cut-away view in FIG. 4. The rubber outer layer 300 protects the device from the elements and provides shock absorption. The conductive layer 302 provides electrical conduction between points in the sensor array layer 306 when depressed through the non-conductive layer 304. The non-conductive layer thus serves as a barrier between the conductive layer 302 and the sensor array layer 306. The sensor array layer detects fine level contact with the conductive layer in order to allow the processing circuitry to determine the location and amount of applied external pressure. The support layer 308 may comprise a non-conductive liquid or foam to provide shock absorption as well as thermal dissipation.

The sensor array of layer 306 generates sensor signals responsive to touch input and the sensor signals are converted by the processing circuitry into commands associated with a communication function supported by the device, such as commands for one or more of the target devices 106. The sensor array in the present embodiment is configured to receive touch input from points distributed over substantially the entire outer surface of the housing, as is apparent from the view shown in FIG. 4. Touch input capability is thereby provided over the entire device with no specific required orientation of fingers, hand, surface or other source of touch input. Also, the points distributed over the outer surface of the housing from which the sensor array receives touch input may be undefined from a point of view of a user providing the touch input. In other words, for example, the user need not touch any particular predetermined points on the housing in order for the touch input to be converted into commands by the device. Thus, the device can be operated without requiring that the user view the device while providing input.

It should be noted in this context that touch input, as indicated above, can be from sources other than the fingers or hands of a user. For example, the interface device 102 can detect a situation in which the device is placed on a hard surface. The term "touch input" as used herein is therefore intended to be broadly construed to include inputs applied to the sensor array from surfaces or other inanimate sources. Also, the term "points" as used herein with reference to locations on the outer surface of the housing at which touch input is received is also intended to be construed broadly, so as to encompass, for example, general areas of the outer surface that receive touch input.

The sensor array layer 306 may be implemented, by way of example, as a grid of electrical contacts. When the rubber outer layer 300 of the device is depressed, the conductive material of the conductive layer 302 makes contact with the grid of contacts of the sensor array layer 306. This grid is able to sense depressions on any area of the outer surface of the device and on multiple points at the same time. In addition, it is able to detect the amount of pressure being applied by the size of the area of contact. For example, more pressure exerted on a single spot will cause a larger area of connection on the grid of contacts. Sensor signals indicative of points of depression and area of depression are generated by the grid of contacts and provided to the processing circuitry of the device.

The processing circuitry disposed within the multi-layer housing of the interface device 102 in the FIG. 3 embodiment includes a CPU 310 that controls the operation of other circuitry elements including cellular and Wi-Fi circuitry 312, global positioning satellite (GPS) circuitry 314, Bluetooth circuitry 316, tactile input and output circuitry 320, audio input and output circuitry 322, an accelerometer 324, a video controller 326, and battery and inductor circuitry 328. Although each of these elements is illustratively shown as a separate integrated circuit in the figure, the elements may be combined into one or several integrated circuits or may be implemented using other arrangements of circuitry.

The CPU 310 runs application software program code to control the operation of the device 102 and to support the various functional features disclosed herein. It may be viewed as an example of processor 200 as illustrated in FIG. 2. The CPU 310 is coupled to each of the other processing circuitry elements of the device and is configured to communicate with these elements to send and receive data and instructions and to perform other functions.

The cellular and Wi-Fi circuitry 312 provides wireless connection to the networks 104A and 104B. Such circuitry may provide communication in accordance with known standards such as 3G, 4G, LTE, Wimax, etc.

The GPS circuitry 314 is configured to acquire GPS data so as to allow the device to determine its exact coordinates.

The Bluetooth circuitry 316 supports wireless communication to nearby peripherals such as earphones, microphone, speakers, keyboard, mouse, printer, display, etc. Other types of short-range wireless communications may be supported in place of or in addition to Bluetooth, including, for example, wireless USB.

The tactile input and output circuitry 320 is connected to the sensor array of layer 306 and receives sensor signals from the array that can be used by the CPU 310 to determine the location and amount of applied external pressure. In addition, this element provides tactile feedback such as vibrations under the control of the CPU. Such vibrations and other tactile feedback mechanisms may utilize various coded patterns to convey information back to the user holding the device. The tactile feedback may be provided, for example, in response to the user activating a particular command, and may be supplemented with audio feedback and other types of output.

The audio input and output circuitry 322 supports a microphone and speaker for audio input and output. The speaker and microphone are preferably arranged below the multiple layers of the housing, and the circuitry 322 may implement appropriate filtering to account for the insulation effect of the layers. High quality audio input and output may make use of the Bluetooth or wireless USB capability previously described.

The accelerometer 324 detects movement of the device 102 and provides such movement data to the CPU 310 for use by applications running on the CPU. More specifically, the accelerometer detects movement in any direction (e.g., up, down, forward, back, left, right) as well as rotation in any direction. This allows the device to operate as a three-dimensional mouse. The accelerometer can also operate in conjunction with the sensor array to support other modes of operation, such as one in which the device is used as a mouse or trackball by rolling the device on a hard surface.

The video controller 326 drives a video display that may be arranged on the surface of the device. For example, at least a portion of the outer surface of the housing may be covered with a flexible electronic display. Arrangements of this type will be described in greater detail with reference to FIGS. 5 and 6.

The battery and inductor circuitry 328 includes a battery to provide power to the other elements, and also includes a pickup element to receive power by induction through the multi-layer housing. Additionally or alternatively it may include a power generator to charge the battery using kinetic energy from device movement.

As noted above, the interface device 102 in the embodiment illustrated in FIGS. 3 and 4 has a sphere or ball shape. In other embodiments, the shape of the device may be more generally spheroidal, or still more generally curvilinear. Thus, embodiments of the invention may be implemented using curvilinear housings in the shape of, for example, an ovoid, octahedron, cylinder, half-sphere, sphere with one or more flat areas, etc. A wide variety of other housing shapes may be used, in any combination.

The embodiment shown in FIGS. 3 and 4 provides a flexible universal interface device that can be held in one hand and detects finger compression or other touch input and converts such touch input into commands for controlling the device itself or one or more of the target devices 106. For example, the processing circuitry may be configured to translate sensor signals corresponding to touch input from multiple fingers of the user into a given one of the commands directed to one of the target devices. As another example, the processing circuitry may be configured to detect a particular orientation of the interface device within a hand or hands of a user based on sensor signals generated by the sensor array responsive to touch input. Thus, the device can automatically orientate itself to the current position of the fingers of a user holding the device. Once the device orientation has been determined, the processing circuitry may alter its interpretation of subsequent sensor signals generated by the sensor array responsive to additional touch input.

Thus, in the embodiment of FIGS. 3 and 4, the user can grip the device in his or her hand and squeeze the device with multiple fingers, and the CPU 310 will utilize sensor signals from the sensor array to determine the exact hand orientation on the device. It can then properly interpret later finger pressure and movement into learned commands. The sensor array will also allow the device to determine when it is set on a hard surface and rolled, thereby allowing it to be used as a mouse or trackball, as noted above. At the same time the sensor array can be used to recognize finger depressions as left, right or middle mouse clicks. Also, since the sensor array is configured to allow detection of multiple simultaneous finger contacts on the outer surface of the device, combinations of finger squeezes can be interpreted as different commands. This can allow a user to "type" a message by using different combinations that are representative of different letters. As another example, movement of fingers can be detected across the outer surface of the device, allowing for finger gestures such as expanding or reducing an onscreen item.

It is also possible for the user to hold the device in two hands, and for the CPU 310 to determine that it is being held in this manner. Again, the orientation of the fingers is instantly detected and tracked. The device can then be used in a manner similar to a keyboard with key points spaced over the outer surface of the device. Additional inputs can be gathered from roll detection on a hard surface or from an in-air tilt. For example, a tilt up can indicate upper case, a tilt right can indicate a space, a tilt left can indicate a backspace, and so on.

The device may be configured to learn new depressions, movements, or combinations thereof to map or remap input characters and other commands.

The CPU 310 processes information received via the sensor array such as information indicating particular points on the outer surface that have been depressed and the size of each depression. It can receive this information simultaneously from all parts of the outer surface of the device, thereby allowing for combinations of touches to greatly expand the possible input variations.

As a more particular example, the device 102 may be used with a video game that involves driving a car. The device is placed on a hard surface and is tilted left or right to indicate the direction to drive, forward to accelerate and backward to brake. Three fingers (e.g., thumb, pointer and middle) perform the function of the traditional left, middle and right mouse keys, respectively. Additionally or alternatively, the touch input may be combined with output from the internal accelerometer 324 to allow for even more creative input variations. For example, the touch input actions can be performed with the device held in the air rather than placed on the hard surface, with the tilting actions being detected by the accelerometer.

The device 102 may be configured to display text and graphics anywhere on its outer surface. As noted above, this can be achieved by covering at least a portion of the outer surface of the housing with a flexible electronic display. Such a display may comprise, by way of example, an array of thin-film transistors which interact with a thin polymer to render an electronic ink across the outer surface of the device. The display can be used to facilitate user input as well as to provide feedback of mode, menu, alerts, errors, warnings or other information. For example, the display can present the face of a person the user is currently talking to via the cellular network interface. Other examples of information that may be displayed include calendar alerts, caller IDs, maps, and incoming text messages.

Figure 5:
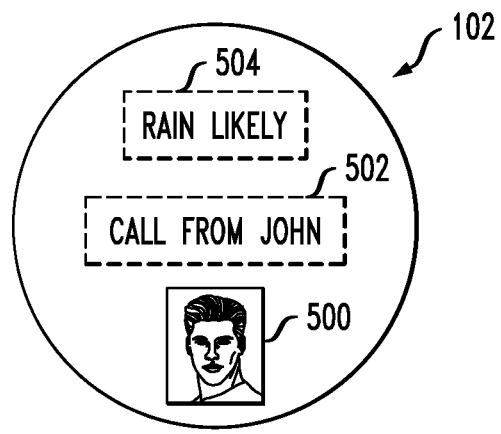
FIG. 5 illustrates one manner in which text and graphics can be displayed on an outer surface of the interface device of FIG. 3.
Figure 6:
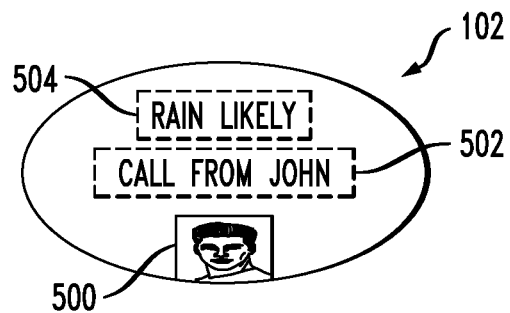
FIG. 6 shows one possible alternative shape for the FIG. 5 interface device.

FIG. 5 shows one possible implementation of interface device 102 with a display capability provided on its outer surface. In this example, the display is presenting information in three distinct areas, including an image or video area 500, a first text area 502 and a second text area 504. More specifically, area 500 presents an image of a caller associated with a particular incoming call, area 502 presents a textual alert regarding the incoming call including an identity of the caller, and area 504 presents textual information regarding a current weather report. The display need not have any particular fixed orientation, and may be adapted based on the previously-described determination of the orientation of the device. FIG. 6 shows another possible implementation of interface device 102 with another type of spheroidal shape, namely, an ovoid shape.

As mentioned previously, the input device 102 is capable of converting touch input and other types of input into commands understood by multiple target devices 106. For example, rolling or moving the device in a particular direction may be converted to a particular command understood by a target device, such as a command to turn up the volume on a television or stereo. This conversion of the touch input or other input into commands understood by the target devices is performed in the processing circuitry of the device, for example, using the controllers 206 in the FIG. 2 embodiment. Thus, the target devices need not have any information regarding the conversion of particular inputs applied to the interface device 102. This is also advantageous for the user, as the user no longer has to learn and memorize separate interfaces for all of the target devices.

Consider a more detailed example in which the target device 106 to be controlled is a television. The user can teach the interface device 102 that a squeeze should turn on the television, a roll up or down should change channels, and a roll left or right should increase or decrease the volume. The interface device would detect these inputs and issue corresponding commands to the television using infrared, Bluetooth, wireless USB, RF or other wireless channels and the particular command codes expected by the brand and model of the television being controlled. These codes could be programmed into the memory 202. Alternatively, the codes could be received in the interface device directly from the target device, or from one of the networks 104A, 104B, 104C and 104D. Similar techniques could be used to allow the interface device to control other types of target devices.

As another example, assume the target device 106 is a car. A user walks near the car while holding the interface device 102 and the device detects the proximity of the car and displays the word "car" on its outer surface. The user provides appropriate touch input or other input to confirm the desire to control the car. The interface device then vibrates or beeps to direct the user to enter the appropriate secure code. The user presses or moves the device in a predetermined manner that corresponds to entry of the secure code, the input device provides the corresponding command to the car, and the car beeps and unlocks its doors. The user then enters the car and uses the input device to set destination location, adjust environmental controls and seat location, begin music, and start the car, all by providing appropriate touch input or other input to the interface device. The interface device converts that input to commands understood by the various systems in the car. Through appropriate standardization of the target device commands, this approach can be made to work with any car, including a rental car.

It is to be appreciated that these and other examples described above are presented to illustrate the operation of certain embodiments of the invention, and should not be construed as limiting in any way. Other embodiments of the invention can be constructed using alternative techniques, and implemented using a wide variety of alternative hardware, software and firmware components.

A given universal interface device configured in accordance with one or more of the illustrative embodiments disclosed herein provides considerable advantages over conventional devices. For example, the universal interface device 102 provides a much more efficient input capability in that it can be operated using one hand and without requiring that the user view the device while supplying input. The device is much sturdier and more durable than a conventional touch-screen interface device. Also, the device can be configured to control a wide variety of external devices or systems, while also supporting communication functionality with multiple external networks of different types. Thus, it can free the user from having to learn and memorize different interfaces for a large number of external devices, while also freeing the target device manufacturers from the expense and added size associated with incorporating complex interfaces into their respective target devices.

It should again be emphasized that the above-described embodiments are intended to be illustrative only. For example, the system and interface device configurations of FIGS. 1 through 6 can be altered in other embodiments. Also, various system and device features, such as the interface device shape, housing, sensor array, internal processing circuitry, and supported communication functions, can be altered in other embodiments. These and numerous other alternative embodiments within the scope of the following claims will be readily apparent to those skilled in the art.

What is claimed is:

1. A communication device comprising:
   a housing;
   processing circuitry disposed within the housing;
   said housing incorporating a sensor array substantially surrounding said processing circuitry and configured to receive touch input from points distributed over an outer surface of the housing;
   wherein the sensor array generates sensor signals responsive to the touch input and the sensor signals are converted by the processing circuitry into commands associated with a communication function supported by the communication device without requiring touch input at particular predetermined ones of the points.

2. The communication device of claim 1 wherein the housing has a spheroidal shape.

3. The communication device of claim 1 wherein the sensor array is configured to receive touch input from points distributed over substantially the entire outer surface of the housing.

4. The communication device of claim 1 wherein the points distributed over the outer surface of the housing from which the sensor array receives touch input are undefined from a point of view of a user providing at least a portion of said touch input.

5. The communication device of claim 1 wherein the housing comprises a plurality of overlapping layers including a sensor array layer comprising the sensor array.

6. The communication device of claim 5 wherein the plurality of layers further comprises:
   a rubber outer layer;
   a conductive layer underlying the rubber outer layer;
   a non-conductive layer underlying the conductive layer and overlying the sensor array layer; and
   a support layer underlying the sensor array layer.

7. The communication device of claim 1 wherein the commands associated with a communication function supported by the communication device comprise at least a first set of one or more commands for controlling a first external device of a first type and a second set of one or more commands for controlling a second external device of a second type.

8. The communication device of claim 1 wherein at least a portion of the outer surface of the housing is covered with a flexible electronic display.

9. The communication device of claim 1 wherein the processing circuitry is configured to detect a particular orientation of the device within a hand or hands of a user based on said sensor signals generated responsive to the touch input.

10. The communication device of claim 9 wherein the processing circuitry based on the detected device orientation alters its interpretation of subsequent sensor signals generated responsive to additional touch input.

11. The communication device of claim 1 wherein the processing circuitry is configured to translate sensor signals corresponding to touch input from multiple fingers of the user into a given one of the commands.

12. The communication device of claim 1 wherein the processing circuitry is configured to translate sensor signals corresponding to touch input from one or more fingers of the user and at least one surface into a given one of the commands.

13. The communication device of claim 1 wherein the communication function comprises a network communication function involving communication between the device and an external network.

14. The communication device of claim 13 wherein the network communication function involves communication between the device and at least one of a cellular network, a Wi-Fi network, a satellite network, a Bluetooth network and a wireless USB network.

15. The communication device of claim 1 wherein the processing circuitry is configured to convert one or more of the sensor signals into one or more of the commands for controlling a particular external device based on translation information supplied to the communication device from the external device.

16. The communication device of claim 1 wherein the housing has a curvilinear shape.

17. A method for use in a communications device, the device comprising a housing and processing circuitry disposed within the housing, the method comprising the steps of:
   generating sensor signals in a sensor array substantially surrounding said processing circuitry responsive to touch input received from points distributed over an outer surface of the housing; and
   converting the sensor signals into commands associated with a communication function supported by the communication device without requiring touch input at particular prefetermined ones of the points.

18. The method of claim 17 wherein the generating step comprises generating the sensor signals responsive to touch input received from points distributed over substantially the entire outer surface of the housing.

19. The method of claim 17 wherein the commands associated with a communication function supported by the communication device comprise at least a first set of one or more commands for controlling a first external device of a first type and a second set of one or more commands for controlling a second external device of a second type.

20. The method of claim 17 further comprising the step of receiving translation information from a particular external device, and the converting step comprises converting one or more of the sensor signals into one or more of the commands for controlling the particular external device based on the translation information supplied to the communication device from the external device.

21. A computer program product comprising processor-executable software code that when executed by a processor of the communication device causes the device to implement the steps of the method of claim 17.

* * * * *

UNITED STATES PATENT AND TRADEMARK OFFICE
CERTIFICATE OF CORRECTION

PATENT NO. : 8,854,314 B2
APPLICATION NO. : 12/569017
DATED : October 7, 2014
INVENTOR(S) : Ronald L. Sharp Page 1 of 1

It is certified that error appears in the above-identified patent and that said Letters Patent is hereby corrected as shown below:

In the claims:

Claim 11, column 9, line 56, after "multiple fingers of" please change "the" to --a--

Claim 12, column 10, line 3, after "one or more fingers of" please change "the" to --a--

Claim 17, column 10, lines 33-34, after "at particular" please change "prefetermined" to --predetermined--

Signed and Sealed this
Thirtieth Day of December, 2014

Michelle K. Lee
*Deputy Director of the United States Patent and Trademark Office*